(12) United States Patent
Klein et al.

(10) Patent No.: US 11,840,995 B2
(45) Date of Patent: Dec. 12, 2023

(54) PISTON DEVICE AND PUMP DEVICE

(71) Applicants: ElringKlinger AG, Dettingen (DE); ElringKlinger Kunststofftechnik GmbH, Bietigheim-Bissingen (DE)

(72) Inventors: Patrick Klein, Leinfelden-Echterdingen (DE); Klaus Hocker, Ingersheim (DE); Fabian Kopp, Tamm (DE)

(73) Assignees: ElringKlinger AG, Dettingen (DE); ElringKlinger Kunststofftechnik GmbH, Bietigheim-Bissingen (DE)

( * ) Notice: Subject to any disclaimer, the term of this patent is extended or adjusted under 35 U.S.C. 154(b) by 213 days.

(21) Appl. No.: 16/199,157

(22) Filed: Nov. 24, 2018

(65) Prior Publication Data

US 2019/0093616 A1 Mar. 28, 2019

Related U.S. Application Data

(63) Continuation of application No. PCT/EP2017/063671, filed on Jun. 6, 2017.

(30) Foreign Application Priority Data

Jun. 6, 2016 (DE) .................... 10 2016 209 930.2

(51) Int. Cl.
*F02M 59/44* (2006.01)
*F02M 59/10* (2006.01)
(Continued)

(52) U.S. Cl.
CPC ........ *F02M 59/442* (2013.01); *F02M 59/102* (2013.01); *F04B 1/0404* (2013.01);
(Continued)

(58) Field of Classification Search
CPC .............. F02M 59/442; F02M 59/102; F02M 2200/9038; F02M 59/06; F02M 59/025;
(Continued)

(56) References Cited

U.S. PATENT DOCUMENTS 2,282,562 A 5/1942 Cole
3,738,665 A 6/1973 Bilco
(Continued)

FOREIGN PATENT DOCUMENTS

CN 201090300 Y 7/2008
CN 102 359 446 A 2/2012
(Continued)

OTHER PUBLICATIONS

Raw Machine Translation of CN204627970 (U); "Single plunger type measuring pump and pump head subassembly thereof"; Gu et al.; Sep. 9, 2015.*
(Continued)

*Primary Examiner* — Charles G Freay
*Assistant Examiner* — Lilya Pekarskaya
(74) *Attorney, Agent, or Firm* — ASLAN LAW, P.C.

(57) ABSTRACT

In order to provide a piston device that is of simple construction and provides optimised sealing, it is proposed that the piston device should include the following: a housing that includes a piston receptacle; a piston that is arranged to be linearly displaceable in the piston receptacle; a main gasket element that separates a first medium space from a second medium space, and a supplementary gasket element, different from the main gasket element, for sealing in a region between the piston and the piston receptacle.

10 Claims, 5 Drawing Sheets

(51) Int. Cl.
*F16J 15/00* (2006.01)
*F16J 15/32* (2016.01)
*F16J 15/56* (2006.01)
*F04B 1/0404* (2020.01)
*F04B 1/0408* (2020.01)
*F04B 53/10* (2006.01)
*F04B 17/05* (2006.01)
*F04B 53/16* (2006.01)
*F04B 53/14* (2006.01)

(52) U.S. Cl.
CPC ............ *F04B 1/0408* (2013.01); *F04B 17/05* (2013.01); *F04B 53/10* (2013.01); *F04B 53/16* (2013.01); *F16J 15/006* (2013.01); *F16J 15/32* (2013.01); *F16J 15/56* (2013.01); *F02M 2200/9038* (2013.01); *F04B 53/143* (2013.01)

(58) Field of Classification Search
CPC ...... F02M 59/027; F02M 59/02; F16J 15/006; F16J 15/32; F16J 15/56; F16J 15/002; F16J 1/02; F04B 19/22; F04B 53/04; F04B 53/16; F04B 15/02
See application file for complete search history.

(56) References Cited

U.S. PATENT DOCUMENTS

| | | | |
|---|---|---|---|
| 5,567,134 A | 10/1996 | Inoue | |
| 7,959,159 B2* | 6/2011 | Hocker | F02M 59/442 |
| | | | 277/559 |
| 9,822,878 B2* | 11/2017 | Fritschle | F16D 25/088 |
| 2003/0089343 A1* | 5/2003 | Yamaguchi | F04B 1/0421 |
| | | | 123/495 |
| 2008/0122184 A1 | 5/2008 | Hocker et al. | |
| 2011/0103985 A1* | 5/2011 | Mancini | F02M 59/442 |
| | | | 417/540 |
| 2014/0251125 A1 | 9/2014 | Fritschle et al. | |
| 2015/0017035 A1* | 1/2015 | McCrindle | F02M 59/102 |
| | | | 417/434 |
| 2015/0308394 A1* | 10/2015 | Flo | F04B 15/02 |
| | | | 417/437 |
| 2015/0369190 A1* | 12/2015 | Ropertz | F02M 59/02 |
| | | | 417/437 |
| 2016/0186742 A1* | 6/2016 | Bhat | F02M 59/025 |
| | | | 92/172 |
| 2016/0319789 A1* | 11/2016 | Petrone | F02M 59/02 |
| 2017/0009721 A1* | 1/2017 | Albrecht | B29C 45/0046 |
| 2017/0009722 A1* | 1/2017 | Stritzel | F04B 19/22 |
| 2018/0010600 A1 | 1/2018 | Spakowski | |

FOREIGN PATENT DOCUMENTS

| | | | |
|---|---|---|---|
| CN | 104854341 A | 8/2015 | |
| CN | 204 627 970 U | 9/2015 | |
| CN | 205260189 U | 5/2016 | |
| DE | 91 07 284 U1 | 8/1991 | |
| DE | 195 22 306 A1 | 1/1996 | |
| DE | 100 28 672 A1 | 12/2001 | |
| DE | 100 26 360 A1 | 2/2002 | |
| DE | 10356813 A1 * | 7/2005 | ............... F16J 15/56 |
| DE | 10 2012 217 260 A1 | 3/2014 | |
| DE | 10 2013 204 365 A1 | 9/2014 | |
| DE | 10 2014 202 794 A1 | 8/2015 | |
| DE | 10 2014 218 992 A1 | 3/2016 | |
| DE | 10 2014 220 705 B4 | 4/2016 | |
| DE | 10 2015 202 635 A1 | 8/2016 | |
| EP | 1 284 367 A1 | 2/2003 | |
| EP | 2 047 148 B1 | 4/2009 | |
| WO | WO 2013/076146 A2 | 5/2013 | |
| WO | WO 2018/009390 A1 | 1/2018 | |

OTHER PUBLICATIONS

Raw Machine Translation of DE10356813 (A1); "Sliding seal arrangement for a piston-and-cylinder unit comprises an annular groove whose bottom is provided with a roughly semicircular recess with a radius corresponding to the radius of the O-ring"; Ammann, Jochen; Jul. 7, 2005.*

* cited by examiner

PISTON DEVICE AND PUMP DEVICE

RELATED APPLICATION

This application is a continuation of international application No. PCT/EP2017/063671 filed on Jun. 6, 2017, and claims the benefit of German application No. 10 2016 209 930.2 filed on Jun. 6, 2016, which are incorporated herein by reference in their entirety and for all purposes.

FIELD OF DISCLOSURE

The present invention relates to a piston device which may be used in particular in a pump device.

BACKGROUND

A piston device may in particular be a constituent part of a high-pressure fuel pump. In a high-pressure fuel pump of this kind, efficient sealing of a high-pressure space may be necessary. For sealing of this kind, the sealing arrangement known from EP 2 047 148 B1 may for example be used.

Fuel pumps and/or piston devices are further known from the following printed specifications: DE 10 2014 218 992 A1, DE 10 2012 217 260 A1, DE 10 2013 204 365 A1, DE 195 22 306 A1 and EP 1 284 367 A1.

SUMMARY OF THE INVENTION

The object of the present invention is to provide a piston device that is of simple construction and provides optimised sealing.

This object is achieved according to the invention by a piston device according to independent claim 1.

Preferably, the piston device includes a housing that includes a piston receptacle.

Further, the piston device preferably includes a piston that is arranged to be linearly displaceable in the piston receptacle.

Moreover, it may be provided for the piston device to include a main gasket element that separates a first medium space from a second medium space.

Further, the piston device preferably includes a supplementary gasket element, different from the main gasket element, for sealing in a region between the piston and the piston receptacle. In particular, a plurality of supplementary gasket elements may be provided.

It may be provided for the piston to adjoin the first medium space at a first end of the piston and the second medium space at a second end of the piston.

Further, it may be provided for the piston to adjoin the first medium space only on one side, at a first end of the piston, or for the piston to be arranged partly or entirely in the first medium space. In particular, in that case a piston rod for actuating the piston is preferably guided through the main gasket element and thus adjoins the second medium space.

The main gasket element may for example be arranged between the piston and the piston receptacle and/or in particular abut sealingly on one side directly against the piston and on the other directly against the piston receptacle.

As an alternative thereto, it may be provided for the main gasket element to be arranged between a piston rod and a housing of the piston device and/or to abut sealingly on one side directly against the piston rod and on the other directly against the housing.

The main gasket element of the piston device according to the invention is in particular a sealing element and/or a sealing arrangement according to EP 2 047 148 B1, to which reference is hereby explicitly made and whereof the content is hereby explicitly incorporated into this description as a constituent part thereof.

It may be provided for the piston receptacle to include a guide device against which the piston abuts, in particular directly abuts, and by means of which the piston is guided in linearly displaceable manner.

The guide device may in particular be a constituent part or portion of the housing, or a supplementary component integrated into the housing.

The supplementary gasket element preferably abuts on one side in particular directly against a guide element of the guide device and on the other in particular directly against the piston.

The supplementary gasket element is preferably a contact seal.

The guide device and the piston preferably take a form such that a split gasket is formed between the guide device and the piston.

In particular if at least one supplementary element is provided, for the purpose of optimising costs a larger tolerance may preferably be provided for the split gasket, for example a greater play.

Preferably, the guide element takes the form of a hollow slide cylinder.

It may be advantageous if the piston is movable to and fro between two end positions.

In one end position of the piston, in which it is moved to the maximum extent in the direction of the second medium space, the supplementary gasket element is preferably arranged in an end region of the guide device that faces the second medium space.

In particular, it may be provided for the supplementary gasket element, in this end position, to be arranged adjacent to an edge of the guide element.

Here, the term "end region" of the guide device should be understood in particular to mean a last third, last quarter or last fifth (in the direction facing the second medium space) of the entire guide device, in particular of a guide element of the guide device.

It may be advantageous if the supplementary gasket element takes a resilient form.

The supplementary element may in particular take the form of a sealing ring, in particular a sealing ring forming a closed or open ring, for example a piston ring forming a closed or open ring. Preferably, there is no gap, as is otherwise conventional in piston rings.

Preferably, the supplementary gasket element is mounted to float on the piston and/or the piston receptacle.

Preferably, the supplementary gasket element comprises a polytetrafluoroethylene (PTFE) material or is made from such a material. Further, as an alternative or in addition thereto, the supplementary gasket element may comprise or be made from one or more of the following materials: thermoplastic material; metal material; fluorothermoplastics, high-temperature thermoplastics, for example from the group comprising polyketones and/or the group comprising polyimides.

The supplementary gasket element preferably has at least approximately a cuboid cross section.

Here, a cross section is in particular a cross section taken perpendicular to a peripheral direction of the in particular ring-shaped gasket element.

Preferably, the cross section is taken in a plane in which a longitudinal centre axis of the piston extends.

It may be provided for the supplementary gasket element to have one or more projections that protrude radially outwards. The projection or projections preferably form one or more sealing edges for the supplementary gasket element to abut against the piston receptacle.

Preferably, the projection takes the form of a closed ring such that the supplementary gasket element is abuttable against the piston receptacle, in particular the guide device, in particular evenly over the peripheral direction and radially outwards.

As an alternative or in addition thereto, it may be provided for the supplementary gasket element to have a projection that protrudes radially inwards. In that case, the projection preferably forms a sealing edge for the supplementary gasket element to abut against the piston, in particular if a supplementary gasket element of this kind is arranged on the piston receptacle and thus, when the piston device is in the use condition, the piston is moved relative to the supplementary gasket element.

It may be provided for the sealing edge to be in a closed ring shape such that the supplementary gasket element is abuttable against the piston evenly and radially inwards, in particular in the peripheral direction.

It may be provided for the supplementary gasket element to be received in a ring-shaped groove. Here, the groove is in particular arranged and/or formed in the piston or the piston receptacle.

Preferably, the groove has a substantially rectangular cross section.

In particular, it may be provided for the groove to be arranged and/or formed in the guide device, for example in a guide element of the guide device.

It may be favourable if the piston takes the form of a plunger.

With a plunger of this kind, in particular the piston and the piston rod are formed as one component. The plunger has a substantially constant cross section, in particular over its entire length.

However, it may also be provided for the piston to be a conventional piston with an associated piston rod.

Preferably, the piston is provided at least in certain regions with a coating, in particular an anti-friction coating.

For example, the piston is provided with a DLC coating (diamond-like carbon coating).

It may be favourable if the supplementary gasket element separates a high-pressure space of the first medium space from a low-pressure space of the first medium space.

In particular, using the supplementary gasket element, it is possible to achieve a greater drop in pressure, along the gap between the piston and the piston receptacle, starting from the high-pressure space. As a result, a pressure load on the main gasket element may preferably be reduced, which may in particular optimise a sealing action and stability thereof.

The piston device described above is suitable in particular for use in a pump device, in particular a high-pressure fuel pump device.

Thus, the present invention also relates to a pump device, in particular a high-pressure fuel pump device.

Preferably, the pump device includes a piston device. The piston device is in particular a piston device according to the invention, but may also be a conventional piston device.

Further, the pump device includes a high-pressure chamber whereof the free volume of the internal space is alternately enlargeable or reducible in size by a linear displacement of the piston.

Moreover, the pump device preferably includes a supply conduit for supplying a first medium to the high-pressure chamber and a removal conduit for removing the first medium from the high-pressure chamber.

The piston is in particular movable into and out of the high-pressure chamber.

The term "free volume of internal space" of the high-pressure chamber should in particular be understood to mean a volume of internal space of the high-pressure chamber that is fillable with a fluid, in particular a liquid.

The internal space of the high-pressure chamber is in particular part of a high-pressure space.

Preferably, the pump device includes a drive device, in particular an eccentric drive or cam drive, for linear displacement of the piston.

Further, it may be provided for the pump device to include a spring element by means of which the piston is pressable against an actuating element of the drive device. The actuating element is in particular an eccentric element of the eccentric drive or cam element of the cam drive.

It may be advantageous if the pump device includes a first medium space that is divided into a high-pressure space and a low-pressure space by a guide device for guiding the piston and/or by a gasket element.

It may be favourable if the first medium space is divided into a high-pressure space and a low-pressure space by one or more supplementary gasket elements.

The pump device preferably includes a connection conduit by which medium is removable for example from the low-pressure space and/or the piston receptacle.

For example, it may be provided for the pump device to include a connection conduit that fluidically connects the low-pressure space and/or the piston receptacle to the supply conduit.

In one embodiment of the invention, it may be provided for the pump device to include a valve device that is associated with the connection conduit and is in particular formed and/or arranged such that, in the event of a movement of the piston out of the high-pressure chamber, the valve device opens and a medium in the low-pressure space and/or a medium in the piston receptacle, in particular in the region of a guide element, is removable from the low-pressure space and/or from the piston receptacle and/or is suppliable to the supply conduit by way of the connection conduit.

It may be provided for the movement of the piston out of the high-pressure chamber to result in an increase in pressure in the low-pressure space and/or in the piston receptacle, in particular in the region of a guide element. As a result, in particular the valve device in the connection conduit can open, with the result that fluid can be removed from the low-pressure space and/or the piston receptacle and consequently a maximum pressure in the low-pressure space and/or in the piston receptacle can be limited.

The valve device is in particular a nonreturn valve.

The high-pressure space may for example be intended for pressures of at least approximately 400 bar, for example approximately 500 bar, if the pump device is for example a high-pressure petrol pump.

If for example the pump device is a high-pressure diesel pump, the high-pressure space may be intended for a pressure of at least approximately 2 000 bar, for example approximately 3 000 bar.

During operation of the piston device, a pressure in the low-pressure space is preferably at most approximately 30 bar, in particular at most approximately 20 bar, for example at most approximately 10 bar.

In particular if the high-pressure space is separated from the low-pressure space by a supplementary gasket element, it may be provided for a pressure in the low-pressure space to be at most approximately 10 bar, for example at most approximately 5 bar, in particular at most approximately 3 bar.

The first medium space is in particular a fuel space. The first medium is thus in particular fuel, for example diesel or petrol.

The second medium space is in particular a drive space, in particular a cam drive space. The medium in the second medium space is in particular oil, for example motor oil.

In one embodiment of the invention, it may be provided for the piston device to include a plurality of gasket elements, wherein in particular one or more main gasket elements and/or one or more supplementary gasket elements are provided.

It may be favourable if a connection conduit ends in a region between two gasket elements, in particular supplementary gasket elements, that succeed one another along a longitudinal axis of the piston. A further end is preferably provided at the supply conduit.

An end of the connection conduit and/or the two gasket elements, in particular supplementary gasket elements, that succeed one another along a longitudinal axis of the piston are in particular arranged and/or formed such that, in any position of the piston in the piston receptacle that occurs during operation of the piston device, as seen in the axial direction in relation to the longitudinal axis of the piston, the end of the connection conduit is always arranged between the two gasket elements that succeed one another along a longitudinal axis of the piston.

It may be advantageous if the piston receptacle, in particular a guide element for guiding the piston, includes a recess for receiving and/or collecting medium. The recess is for example a ring-shaped groove. Preferably, a ring-shaped collection region for medium, in particular first medium and/or second medium, is formed by the recess.

Preferably, a connection conduit ends in the recess, in particular in the ring-shaped collection region.

It may be favourable if the recess, in particular the ring-shaped collection region, and/or the two gasket elements, in particular supplementary gasket elements, that succeed one another along a longitudinal axis of the piston are arranged and/or formed such that, in any position of the piston in the piston receptacle that occurs during operation of the piston device, as seen in the axial direction in relation to the longitudinal axis of the piston the recess, in particular the ring-shaped collection region, is always arranged between the two gasket elements that succeed one another along a longitudinal axis of the piston.

In a position of the piston in the piston receptacle in which one of the gasket elements, preferably a gasket element arranged facing the high-pressure space, is closest to the end of the connection conduit and/or the recess, the spacing between this gasket element and the end of the connection conduit and/or the recess is preferably at least approximately 0.2 mm, in particular at least approximately 0.5 mm, preferably at least approximately 1 mm. Further, the spacing may be at least approximately 5 times or at least approximately 10 times the amount of a play between the piston and the piston receptacle and/or the piston and the gasket element, in particular in relation to the axial and/or the radial direction.

As an alternative or in addition thereto, it may be provided for an end of the connection conduit and/or the recess on the one hand and a groove for receiving a gasket element, in particular a supplementary gasket element, on the other to overlap, at least partly, in the axial direction in relation to the longitudinal axis of the piston when the piston is in a position in the piston receptacle in which the gasket element, preferably a gasket element that is arranged facing the low-pressure space, is closest to the end of the connection conduit and/or the recess.

A stroke length of the piston, that is to say the spacing between the two furthest-apart positions of the piston in the piston receptacle, is preferably smaller than a spacing between the two gasket elements, in particular supplementary gasket elements, that succeed one another along a longitudinal axis of the piston.

Preferably, both gasket elements, in particular supplementary gasket elements, are fixed to the piston, in particular being fixed in grooves arranged in the piston.

However, it may also be provided for a supplementary gasket element, in particular a supplementary gasket element that faces the low-pressure space, to take the form of a rod seal that is arranged in particular in a fixed location in a groove in the piston receptacle.

Further preferred features and/or advantages of the invention form the subject matter of the description below and the representation in the drawings of exemplary embodiments.

BRIEF DESCRIPTION OF THE DRAWINGS

Like or functionally equivalent elements are provided with the same reference numerals in all the Figures.

DETAILED DESCRIPTION OF THE DRAWINGS

Figure 1:
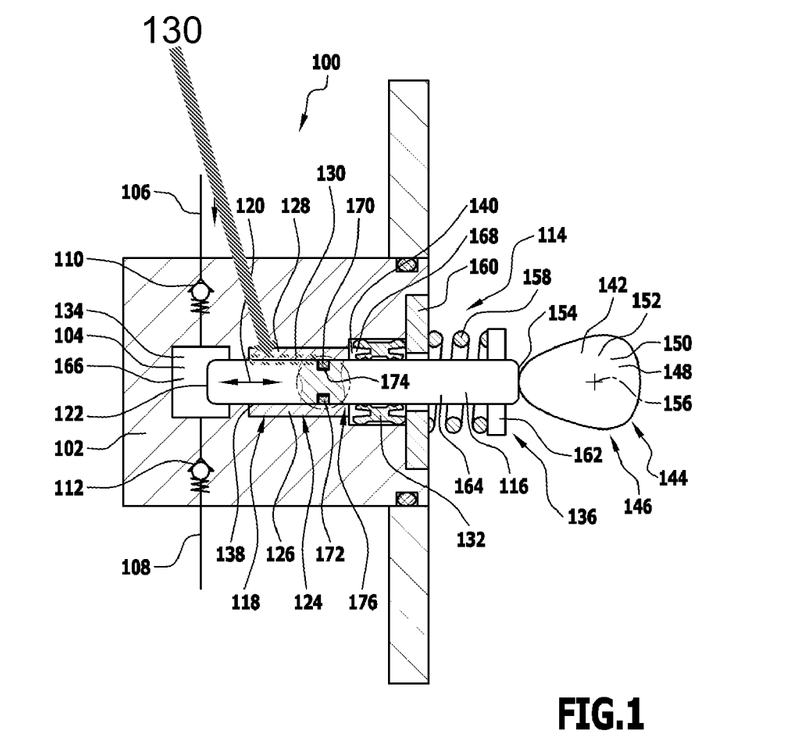
FIG. 1 shows a schematic section through a first embodiment of a pump device that includes a piston device having a main gasket element and a supplementary gasket element.

A first embodiment, illustrated in FIG. 1, of a pump device that is designated 100 as a whole is used for example as a high-pressure fuel pump in motor vehicles.

The pump device 100 includes a housing 102 that surrounds a high-pressure chamber 104.

A medium, in particular fuel, can be supplied to the high-pressure chamber 104 using a supply conduit 106 of the pump device 100.

The medium can be removed from the high-pressure chamber 104 by way of a removal conduit 108.

An inlet valve 110 is preferably arranged in the supply conduit 106.

An outlet valve 112 is preferably arranged in the removal conduit 108.

The pump device 100 further includes a piston device 114.

The piston device 114 includes a piston 116 that is arranged to be linearly displaceable in a piston receptacle 118.

Here, the piston 116 is in particular arranged to be displaceable on the housing 102 such that it is alternately movable into and out of the high-pressure chamber 104 along its longitudinal axis 120.

Thus, it is possible using the piston 116 in particular to vary a free volume of internal space of the high-pressure chamber 104 that is to be filled with the medium.

By suitably configuring and/or controlling the inlet valve 110 and/or the outlet valve 112, this makes it possible to generate a high pressure in the high-pressure chamber 104 in order to be able to supply fuel, which is in particular at high pressure, to combustion chambers of a motor device.

Here, the piston 116 projects into the high-pressure chamber 104 in particular by a first end 122 of the piston 116.

Preferably, the piston device 114 includes a guide device 124 for guiding the piston 116.

The guide device 124 includes in particular a guide element 126 that takes the form in particular of a hollow slide cylinder 128.

The guide device 124, in particular the guide element 126, is in particular a constituent part of the piston receptacle 118.

Between the piston receptacle 118 and the piston 116 there is formed in particular a split gasket 130.

Preferably, using the split gasket 130 it is possible to achieve the effect that only small quantities of the medium in the high-pressure chamber 104 are removed from the high-pressure chamber 104 by the movement of the piston 116.

In particular, using the split gasket 130 it is possible to lower a high pressure prevailing in the high-pressure chamber 104 in order ultimately to minimise a pressure on a side of the guide device 124 remote from the high-pressure chamber 104.

The piston device 114 includes in particular a main gasket element 132.

The main gasket element 132 is preferably arranged between the piston 116 and the housing 102, in particular the piston receptacle 118.

The main gasket element 132 in particular takes a substantially ring-shaped form.

In particular, the main gasket element 132 is a sealing element according to one of the embodiments described in EP 2 047 148 B1.

The piston 116 is in particular guided through the main gasket element 132 such that a radially inner region of the main gasket element 132 abuts directly against the piston 116.

A radially outer sealing region of the main gasket element 132 abuts in particular directly against the housing 102, for example against the piston receptacle 118.

In particular, a first medium space 134 is fluidically separated from a second medium space 136 by means of the main gasket element 132.

The first medium space 134 is in particular the space that is filled with the medium in the high-pressure chamber 104, in particular fuel, or into which this medium can penetrate during normal operation of the pump device 100.

Thus, the first medium space 134 includes in particular the high-pressure chamber 104, a gap 138 between the piston 116 and the piston receptacle 118, and a (for example ring-shaped) region 140 between the guide element 126 of the guide device 124 and the main gasket element 132.

The second medium space 136 is in particular a space in which there is arranged a drive device 142 for driving the piston 116.

Here, the drive device 142 is only illustrated and described by way of example, and may where necessary include further or additional elements, such as roller bearings, washers, needle bearings, bushings, rollers, force transmission elements, such as are used in eccentric or cam drives.

The drive device 142 is in particular an eccentric drive 144 or cam drive 146.

The drive device 142 includes in particular an eccentric element 148 of the eccentric drive 144 or a cam element 150 of the cam drive 146.

The eccentric element 148 or cam element 150 forms in particular an actuating element 152 for actuating the piston 116.

In particular, the actuating element 152 acts on a second end 154 of the piston 116 that is remote from the high-pressure chamber 104.

The actuating element 152 is in particular rotatable about an axis of rotation 156 and, as a result of being mounted eccentrically, is able to move the piston 116 to and fro along the longitudinal axis 120.

A spring element 158 of the piston device 114 preferably ensures that the piston 116 is always pressed against the actuating element 152.

Here, the spring element 158 in particular takes the form of a pressure spring and is clamped between an annular disc 160 that fixes the main gasket element 132 and/or that closes off the piston receptacle 118, on the one hand, and an abutment plate 162 that is arranged at the second end 154 of the piston 116, on the other.

In the first embodiment of the pump device 100, illustrated in FIG. 1, the piston 116 in particular takes the form of a plunger 164.

The first medium space 134 is preferably divided into a high-pressure space 166 and a low-pressure space 168 by the guide device 124 and/or the split gasket 130.

Here, the high-pressure space 166 is formed in particular by the high-pressure chamber 104.

The low-pressure space 168 is preferably the ring-shaped region 140 between the guide device 124 and the main gasket element 132.

A pressure difference between the high-pressure space 166 and the low-pressure space 168 is preferably produced by the lowering of pressure using the split gasket 130.

To optimise this lowering of pressure and thus to further reduce the pressure in the low-pressure space 168, it may be provided for the piston device 114 to include a supplementary gasket element 170.

The supplementary gasket element 170 is in particular a piston ring 172 which optimises sealing between the piston 116 and the piston receptacle 118, in particular the guide device 124.

The supplementary gasket element 170 is in particular arranged in a groove 174 in the piston 116 or in the piston receptacle 118.

The groove 174 and/or the supplementary gasket element 170 preferably have a substantially rectangular cross section.

Preferably, the supplementary gasket element 170 takes a resilient form, at least in certain regions, in order to achieve reliable abutment thereof against the piston 116 and/or the piston receptacle 118. Moreover, this may preferably enable and/or facilitate simple mounting of a supplementary gasket element 170 in the shape of a closed ring.

As a result of the additional sealing by the supplementary gasket element 170, in particular an absolute pressure in the low-pressure space 168 can be reduced, which may ultimately enhance the stability and leak-tightness of the main gasket element 132.

Preferably, the supplementary gasket element 170 is arranged on the piston 116 such that, in every conceivable position of the piston 116 as it moves along the longitudinal axis 120, the supplementary gasket element 170 is always arranged in the region of the guide device 124 and in particular is always in abutment against the guide element 126.

In particular, in this case the supplementary gasket element 170 is preferably arranged such that, when the piston 116 is in an end position in which it is moved away from the high-pressure chamber 104 to the maximum extent, the supplementary gasket element 170 is arranged in an end region 176 of the guide device 124.

The end region 176 is in particular a last third, last quarter or last fifth, in relation to the length of the guide device 124 along the longitudinal axis 120, of the guide device 124, on the side of the guide device 124 facing the second medium space 136.

Functioning of the first embodiment of the pump device 100, illustrated in FIG. 1, is as follows.

The drive device 142 is used to rotate the actuating element 152 about the axis of rotation 156.

As a result of the shape of the actuating element 152, and because the piston 116 is always pressed against the actuating element 152 by the spring element 158, the piston 116 is displaced linearly in the piston receptacle 118.

In particular, this produces a to-and-fro movement of the piston 116 along its longitudinal axis 120.

During this, the piston 116 is alternately moved into and out of the high-pressure chamber 104.

This results in an internal space of the high-pressure chamber 104 that is fillable with fluid being alternately enlarged and reduced in size.

This is in turn utilised to draw a medium, in particular fuel, through the supply conduit 106 by suction, namely while the piston 116 is moving out of the high-pressure chamber 104.

Here, in particular the inlet valve 110 in the supply conduit 106 is opened, for example automatically as a result of the pressures prevailing in the supply conduit 106 and the high-pressure chamber 104.

When the piston 116 is arranged in the end position in which it is moved away from the high-pressure chamber 104 to the maximum extent, the inlet valve 110 closes such that in particular the medium cannot flow back into the supply conduit 106 from the high-pressure chamber 104.

When the piston 116 is now moved back into the high-pressure chamber 104, this brings about a pronounced increase in the pressure of the medium in the high-pressure chamber 104. In particular, pressures of several hundred bar or even several thousand bar may be generated.

By a suitable selection and/or adjustment of the outlet valve 112 in the removal conduit 108, it is possible if a predetermined pressure level is exceeded to remove the medium that is under high pressure via the removal conduit 108, by opening the outlet valve 112.

This medium under high pressure may then be utilised in particular for high-pressure injection in combustion chambers of internal combustion engines.

Because of the high pressures prevailing at times in the high-pressure chamber 104, it may happen that medium escapes from the high-pressure chamber 104 and flows along the piston 116, through the gap 138 between the piston 116 and the piston receptacle 118.

This brings about in particular an increase in pressure in the region of the main gasket element 132, which can ultimately result in a reduction in the leak-tightness of this main gasket element 132 or a shortening of the useful life of this main gasket element 132.

This effect can be at least partly countered by using the supplementary gasket element 170.

Using the supplementary gasket element 170, in particular a more pronounced drop in pressure between the high-pressure space 166 and the low-pressure space 168 is produced, and the flow of leakage along the piston 116 is minimised.

Figure 2:
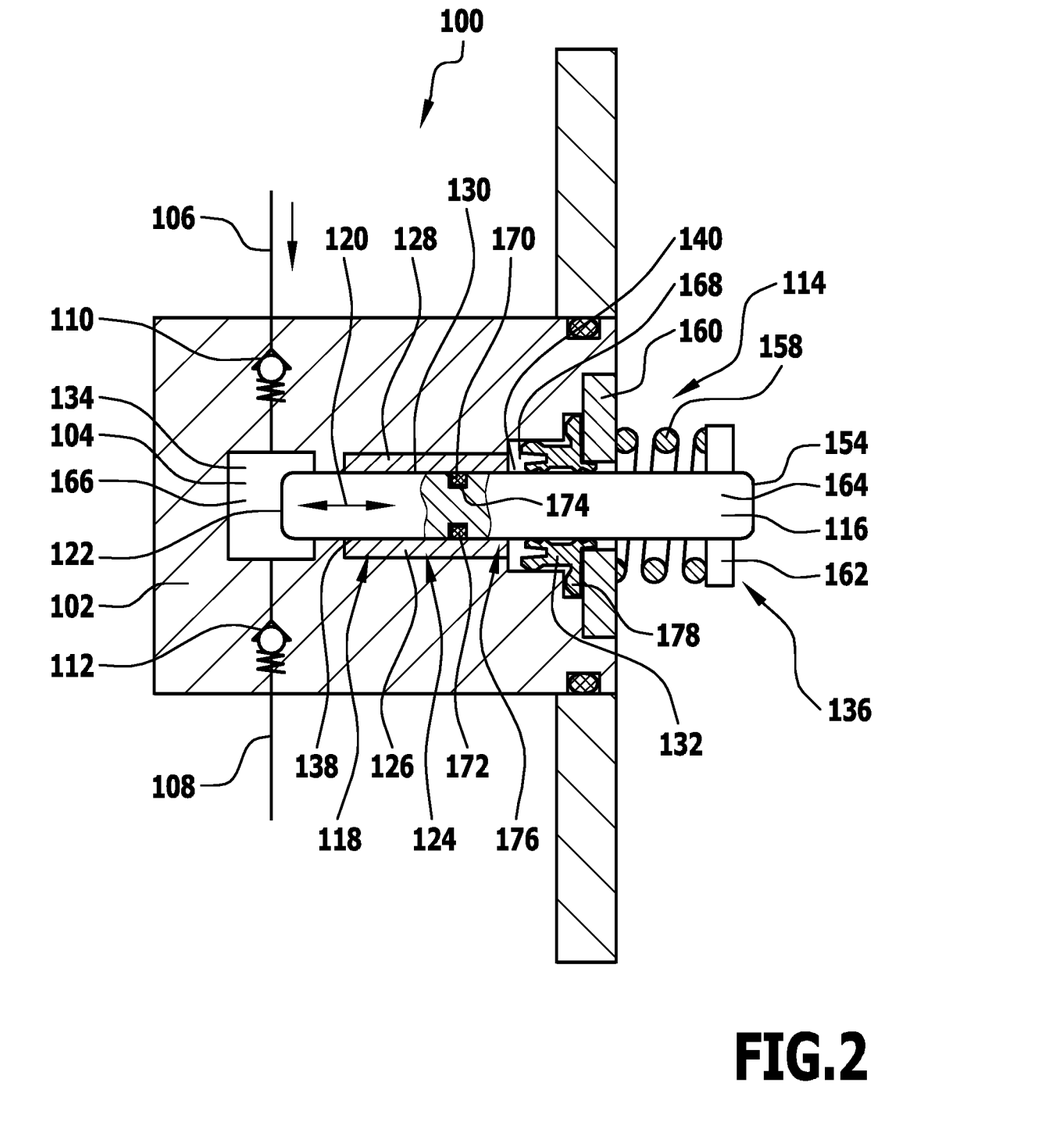
FIG. 2 shows a schematic illustration, corresponding to FIG. 1, of a second embodiment of a pump device, in which the main gasket element is provided with an alternative configuration.

A second embodiment of a pump device 100, illustrated in FIG. 2, differs from the first embodiment illustrated in FIG. 1 substantially in that the main gasket element 132 includes a radially outwardly protruding ring-shaped projection 178.

This projection 178 is used to clamp the main gasket element 132 preferably between an annular disc 160 and the housing 102 of the pump device 100, in particular in order to fix the main gasket element 132 reliably along the longitudinal axis 120 of the piston 116.

Otherwise, the second embodiment of the pump device 100 that is illustrated in FIG. 2 corresponds, as regards its structure and functioning, to the first embodiment illustrated in FIG. 1, so in this respect reference is made to the description thereof above.

Figure 3:
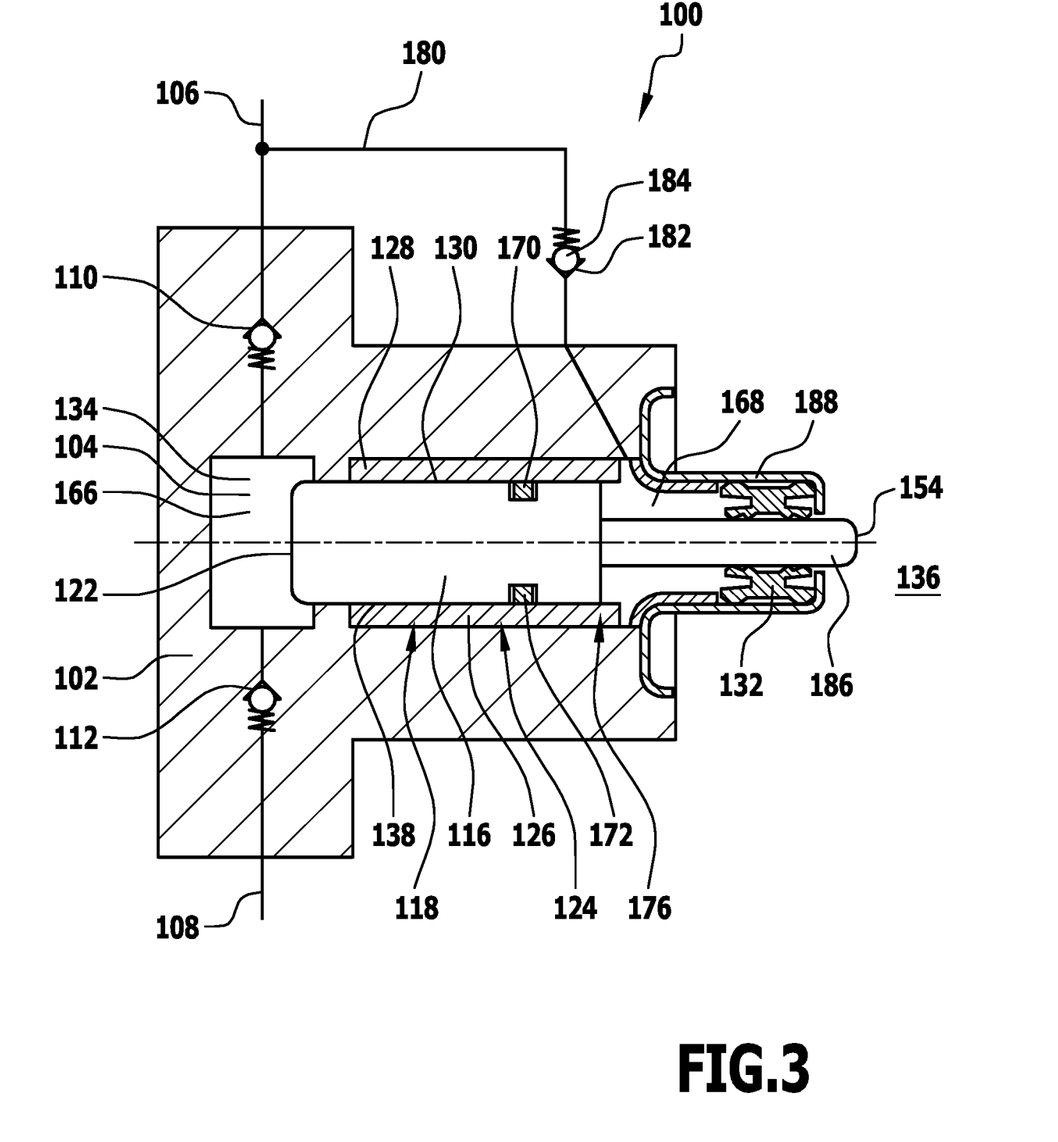
FIG. 3 shows a schematic illustration, corresponding to FIG. 1, of a third embodiment of a pump device, in which a connection conduit is provided between a low-pressure space and a supply conduit.

A third embodiment of a pump device 100, illustrated in FIG. 3, differs from the first embodiment illustrated in FIG. 1 substantially in that a connection conduit 180 is provided.

Using the connection conduit 180, in particular medium is removable from the low-pressure space 168.

The connection conduit 180 preferably includes a valve device 182, for example a nonreturn valve 184, which opens if a predetermined pressure in the low-pressure space 168 is exceeded and makes it possible to remove medium from the low-pressure space 168.

The connection conduit 180 in particular forms a fluid connection between the low-pressure space 168 and the supply conduit 106. As an alternative thereto, it is also possible for a fluid connection to be formed between the low-pressure space 168 and a medium tank (not illustrated).

Using the connection conduit 180, it is thus possible in particular for medium to be removed from the low-pressure space 168 and supplied, via the supply conduit 106, for example to the high-pressure chamber 104 again.

It is also preferably possible, using a connection conduit 180 of this kind, to reduce pressure in the low-pressure space 168.

In this case, the supplementary gasket element 170 may optionally be provided.

In the third embodiment of the pump device 100, illustrated in FIG. 3, it is moreover provided for the piston device 114 to include a piston rod 186.

The piston rod 186 is in particular fixed to the piston 116 and serves to transmit force from the actuating element (not illustrated in FIG. 3) to the piston 116.

Sealing between the first medium space 134 and the second medium space 136 is effected using the main gasket element 132, preferably in the region of the piston rod 186.

In this case, the main gasket element 132 is preferably arranged on the housing 102 by means of a separate housing component or supplementary component 188, and provides a seal on the one hand radially outwards, towards the housing component or supplementary component 188, and radially inwards towards the piston rod 186.

Otherwise, the third embodiment of the pump device 100 that is illustrated in FIG. 3 corresponds, as regards its structure and functioning, to the first embodiment illustrated in FIG. 1, so in this respect reference is made to the description thereof above.

FIGS. 4 to 9 illustrate different variants of supplementary gasket elements 170 which may optionally be used for each of the configurations of the pump device 100 that are described.

Figure 4:
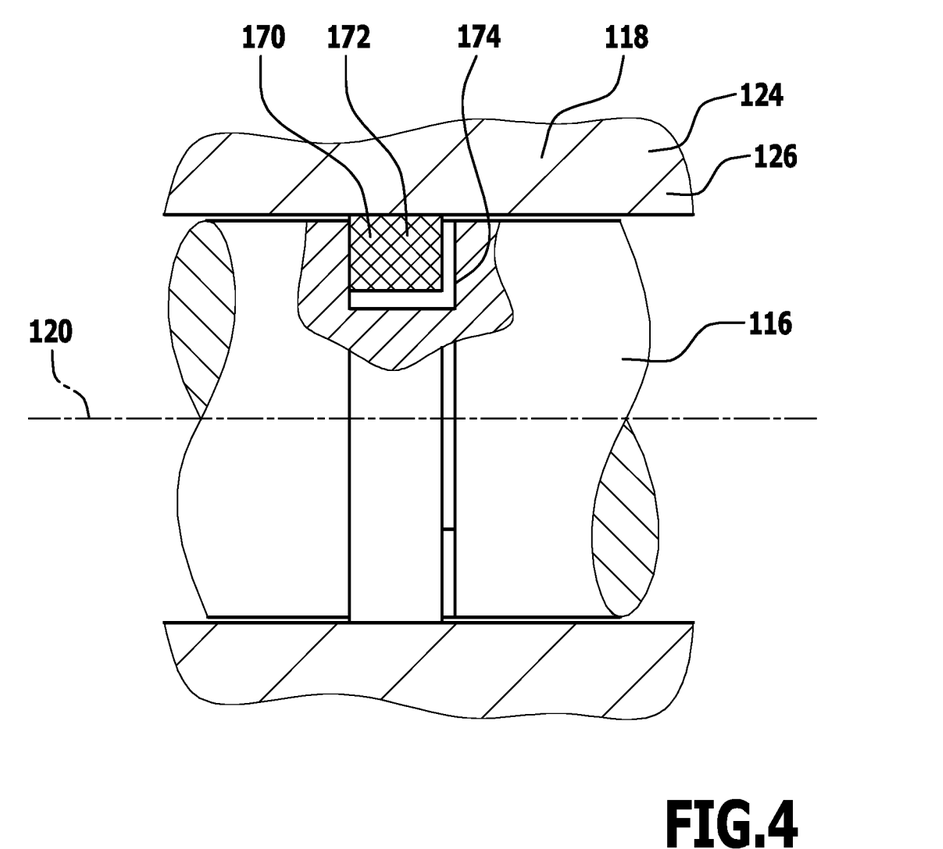
FIG. 4 shows an enlarged illustration of a supplementary gasket element arranged on a piston.

According to the embodiment illustrated in FIG. 4, a rectangular, in particular substantially square, cross section of the supplementary gasket element 170 is provided.

Here, the supplementary gasket element 170 preferably has a size or takes a form, in particular a resilient form, such that it is pressed against the guide device 124 by its radially outer side.

Because of the differences in pressure prevailing between the high-pressure space 166 and the low-pressure space 168, it is preferably likewise possible to bring about pressing of the supplementary gasket element 170 against the guide device 124.

This contact pressure can be optimised by a suitable geometry of the supplementary gasket element 170.

Further, and as a result of the pressure differences existing between the high-pressure space 166 and the low-pressure space 168, the supplementary gasket element 170 is preferably pressed against one side of the groove 174. As an alternative or in addition thereto, preferably one or more biasing elements, for example an O-ring and/or a spring, may be provided for the purpose of applying contact pressure to the supplementary gasket element 170.

The described actions of contact pressure preferably produce optimum sealing.

Here, optimum sealing is not necessarily complete sealing. Rather, a small amount of leakage may be desirable, in particular in order to achieve lubrication of the supplementary gasket element 170, for the purpose of avoiding or minimising effects of abrasion.

Figure 5:
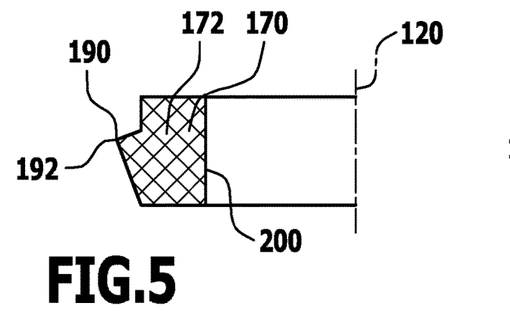
FIG. 5 shows a schematic sectional illustration of an alternative configuration of a supplementary gasket element, in which a radially outwardly protruding projection that forms a sealing edge is provided.

According to the embodiment of the supplementary gasket element 170 illustrated in FIG. 5, it has a radially outwardly protruding projection 190, which in particular forms a sealing edge 192.

Here, the sealing edge angles adopted by the sealing edge 192 are preferably selected such that, as a result of movement of the piston 116 in relation to the piston receptacle 118, the amount of leakage and thus a stream of medium is greater in the direction of the high-pressure space 166 than in the direction of the low-pressure space 168. As a result, in particular at least a small return flow of medium that has escaped from the high-pressure chamber 104 back into the high-pressure chamber 104 can be achieved.

In particular, the sealing edge 192 substantially takes the form of a closed ring.

Figure 6:
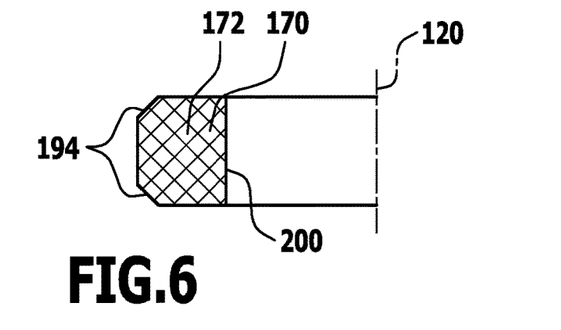
FIG. 6 shows a schematic sectional illustration of an alternative configuration of a supplementary gasket element, in which bevelled radially outer edges are provided.

According to FIG. 6, a supplementary gasket element 170 may have one or two bevelled edges 194. The bevelled edges 194 are in particular radially outer edges 194.

As a result of the bevelled form of the edges 194, in particular wear can be minimised.

Figure 7:
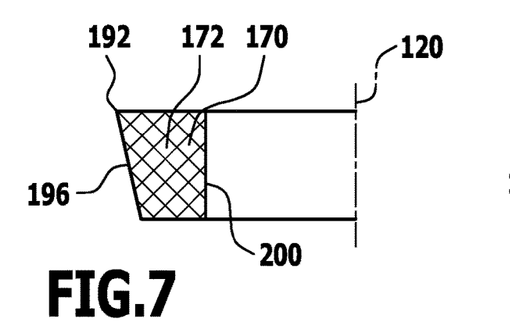
FIG. 7 shows a schematic sectional illustration of an alternative configuration of a supplementary gasket element, in which a radially outer surface has the shape of a surface of a truncated cone.

According to the embodiment of the supplementary gasket element 170 illustrated in FIG. 7, it has an outer side 196 that is oriented obliquely in relation to the longitudinal axis 120.

Thus, the outer side 196 is in particular in the form of an outer surface of a truncated cone.

This in particular has the result that a radially outer sealing edge 192 takes a tapered form.

In various applications, this may bring about an optimised sealing action and/or minimised wear.

Figure 8:
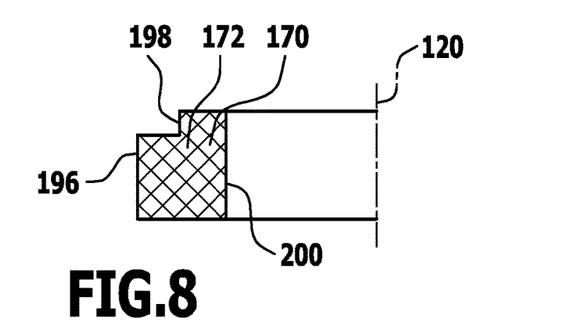
FIG. 8 shows a schematic sectional illustration of an alternative configuration of a supplementary gasket element, in which a stepped shape is provided.

According to the embodiment of the supplementary gasket element 170 illustrated in FIG. 8, a stepped configuration is provided.

Here, a radially outward outer side 196 of the supplementary gasket element 170 takes a form that is shortened in particular in a direction parallel to the longitudinal axis 120, and is connected to a comparatively longer inner side 200 by way of a step 198.

This too has the result that an optimised sealing action and/or minimised wear can be produced in certain applications.

Figure 9:
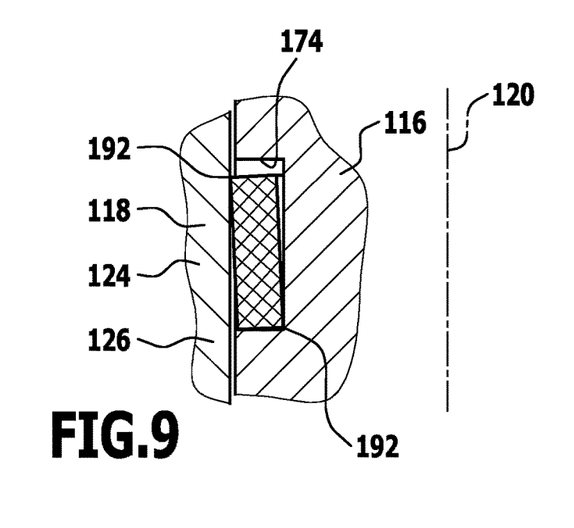
FIG. 9 shows an enlarged sectional illustration of an alternative configuration of a supplementary gasket element in the mounted condition thereof, wherein the supplementary gasket element takes at least approximately the form of a truncated cone.

According to the embodiment of the supplementary gasket element 170 illustrated in FIG. 9, in the mounted condition and/or in the use condition it preferably takes at least approximately the shape of a truncated cone, with the result that an outer side 196 oriented obliquely in relation to the longitudinal axis 120 and an inner side 200 oriented obliquely in relation to the longitudinal axis 120 are produced.

Further, this has the result that the supplementary gasket element 170 projects radially outwards by means of one sealing edge 192 and radially inwards by means of a further sealing edge 192.

The two sealing edges 192 thus in particular form sealing edges 192 for abutment against the piston receptacle 118, in particular the guide device 124, and against the piston 116, in particular the groove 174, respectively.

The supplementary gasket elements 170 may in particular be made from a resilient PTFE material.

Further, as an alternative or in addition, the supplementary gasket element 170 may preferably comprise or be made from one or more of the following materials: thermoplastic material; metal material; fluorothermoplastics, high-temperature thermoplastics, for example from the group comprising polyketones and/or the group comprising polyimides.

Further, it may be provided for the piston 116 to be provided with a friction-reducing and/or wear-minimising coating.

The coating may for example be a diamond-like carbon coating.

The above-mentioned features of the supplementary gasket element 170 and/or the piston 116 are preferably suitable for optimising all the embodiments of pump devices 100.

In further embodiments of pump devices 100 that are not illustrated, individual or a plurality of features of the above-described embodiments may be combined with one another in any desired manner.

For example, the connection conduit 180 according to the third embodiment of the pump device 100, illustrated in FIG. 3, may be used for the purpose of optimising the first embodiment, illustrated in FIG. 1.

The invention claimed is:

1. A high-pressure fuel pump device, including:
   a piston device, which comprises: a housing that includes a piston receptacle; a piston that is arranged to be linearly displaceable in the piston receptacle; and a main gasket element that separates a first medium space from a second medium space,
   wherein the piston device includes a supplementary gasket element, different from the main gasket element, for sealing in a region between the piston and the piston receptacle;
   a high-pressure chamber whereof a free volume of an internal space is alternately enlargeable or reducible in size by a linear displacement of the piston;
   a supply conduit for supplying a first medium to the high-pressure chamber; and
   a removal conduit for removing the first medium from the high-pressure chamber,
   wherein the supplementary gasket element is received in a ring-shaped groove,
   wherein the ring-shaped groove is arranged in the piston in between two groove edges at an outer surface of the piston, the piston having a longitudinal axis, each groove edge lying in a respective plane, both of those two planes being perpendicular to the longitudinal axis of the piston,
   wherein the piston receptacle includes a guide device against which the piston abuts and by means of which the piston is guided in linearly displaceable manner, wherein the guide device includes a guide element that takes a form of a hollow slide cylinder, wherein the supplementary gasket element abuts on one side against the guide element of the guide device and on another side against the piston,
   wherein the supplementary gasket element, when in a mounted condition in the ring-shaped groove of the piston, has a shape that stays in between the two planes,
   wherein the high-pressure fuel pump device includes the first medium space,
   wherein the first medium space is divided into a high-pressure space and a low-pressure space by the supplementary gasket element,
   a piston rod is fixed to the piston, wherein the piston rod transmits a force to the piston, and
   the main gasket element is arranged on the housing in a manner separate and independent from the piston receptacle, and the main gasket element provides a seal radially outwards, towards the housing or a separate housing component or a supplementary component, and radially inwards towards the piston rod,
   wherein the piston is movable to and fro between two end positions,
   wherein, in one end position of the piston, in which the piston is moved to a maximum extent in a direction of the second medium space, the supplementary gasket element is arranged in an end region of the guide device that faces the main gasket element, and
   wherein the direction to the maximum extend being parallel to the longitudinal axis, wherein the end region of the guide device is a last third of the guide element, in relation to a length of the guide device along the longitudinal axis, the last third is facing the main gasket element.

2. The high-pressure fuel pump device according to claim 1, wherein the supplementary gasket element takes a resilient form.

3. The high-pressure fuel pump device according to claim 1, wherein the supplementary gasket element has a projection that protrudes radially outwards and forms a sealing edge for the supplementary gasket element to abut against the piston receptacle.

4. The high-pressure fuel pump device according to claim 1, wherein the piston takes the form of a plunger.

5. The high-pressure fuel pump device according to claim 1, wherein the high-pressure fuel pump device includes a connection conduit by which a medium is removable from the low-pressure space.

6. The high-pressure fuel pump device according to claim 1, wherein the high-pressure fuel pump device includes a connection conduit that fluidically connects the low-pressure space to the supply conduit.

7. The high-pressure fuel pump device according to claim 5, wherein the high-pressure fuel pump device includes a valve device that is associated with the connection conduit and is formed and/or arranged such that, in the event of a movement of the piston out of the high-pressure chamber, the valve device opens and medium in the low-pressure space is removable from the low-pressure space and/or is suppliable to the supply conduit by way of the connection conduit.

8. The high-pressure fuel pump device according to claim 1, wherein the supplementary gasket element is a sealing ring forming a closed ring.

9. The high-pressure fuel pump device according to claim 1, wherein the supplementary gasket element is a piston ring forming a closed ring.

10. The high-pressure fuel pump device according to claim 1, wherein the main gasket element is arranged on the housing via the separate housing component or the supplementary component, and the main gasket element provides the seal radially outwards, towards the housing component or the supplementary component, and radially inwards towards the piston rod.

* * * * *